United States Patent
Liu et al.

(10) Patent No.: US 12,268,989 B2
(45) Date of Patent: Apr. 8, 2025

(54) CERAMIC-BASED COMPOSITE MATERIAL USED FOR LOW-CONCENTRATION FORMALDEHYDE DEGRADATION AND PREPARATION METHOD THEREFOR

(71) Applicant: BEIJING UNIVERSITY OF TECHNOLOGY, Beijing (CN)

(72) Inventors: Xiaomin Liu, Beijing (CN); Yufeng Wu, Beijing (CN); Bin Li, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/757,361

(22) Filed: Jun. 27, 2024

(65) Prior Publication Data
US 2024/0342653 A1    Oct. 17, 2024

Related U.S. Application Data

(63) Continuation of application No. PCT/CN2023/134194, filed on Nov. 27, 2023.

(30) Foreign Application Priority Data

Nov. 29, 2022 (CN) .......................... 202211505110.4

(51) Int. Cl.
*B01D 53/88* (2006.01)
*B01D 53/86* (2006.01)
*B01J 23/58* (2006.01)

(52) U.S. Cl.
CPC ......... *B01D 53/88* (2013.01); *B01D 53/8668* (2013.01); *B01J 23/58* (2013.01)

(58) Field of Classification Search
None
See application file for complete search history.

(56) References Cited

U.S. PATENT DOCUMENTS

| 2019/0168173 A1 | 6/2019 | Tsapatsis |
| 2021/0379559 A1 | 12/2021 | Weston |

FOREIGN PATENT DOCUMENTS

| CN | 104492381 A | 4/2015 |
| CN | 105289298 A | 2/2016 |

(Continued)

OTHER PUBLICATIONS

International Search Report for PCT/CN2023/134194.
Search Report for CN2022115051104.

*Primary Examiner* — Jelitza M Perez
(74) *Attorney, Agent, or Firm* — J.C. PATENTS

(57) ABSTRACT

A ceramic-based composite material used for low-concentration formaldehyde degradation, and preparation method therefor belonging to the technical field of environmental engineering. The present invention comprises: utilizing an alkali metal-transition metal (i.e. A-T) alcohol solution mixed at low temperature with a $TiO_2$ sol to obtain an A-T-$TiO_2$ sol; immersing activated ceramic (HFC) into the A-T-$TiO_2$ sol, and stirring at normal temperature to obtain A-T-$TiO_2$/HFC; subjecting the obtained A-T-$TiO_2$/HFC to primary drying and primary low-temperature calcination to form A-T-$TiO_2$/FC; then immersing the A-T-$TiO_2$/FC into a metal-organic framework (MOF)-amino silane sol to obtain an aminated A-T-$TiO_2$/MOF/NFC precursor; and finally, subjecting the obtained precursor to secondary drying and secondary low-temperature calcination, forming an A-T-$TiO_2$/MOF/NFC composite material. The present invention effectively degrades low-concentration formaldehyde in indoor environments or in air. Loading MOF on an aminated ceramic and doping alkali metal significantly improve the formaldehyde enrichment and degradation performance of (Continued)

the composite material, which is beneficial to the thorough removal of low-concentration formaldehyde in indoor environments or in air.

3 Claims, 1 Drawing Sheet

(56) References Cited

FOREIGN PATENT DOCUMENTS

| | | |
|---|---|---|
| CN | 105833919 A | 8/2016 |
| CN | 108579741 A | 9/2018 |
| CN | 109482241 A | 3/2019 |
| CN | 111249918 A | 6/2020 |
| CN | 111804144 A | 10/2020 |
| CN | 112808312 A | 5/2021 |
| CN | 112871214 A | 6/2021 |
| CN | 113499801 A | 10/2021 |
| CN | 115318097 A | 11/2022 |
| CN | 115870006 A | 3/2023 |
| EP | 1676625 A1 | 7/2006 |
| WO | WO2010098586 A2 | 9/2010 |
| WO | WO2019137020 A1 | 7/2019 |

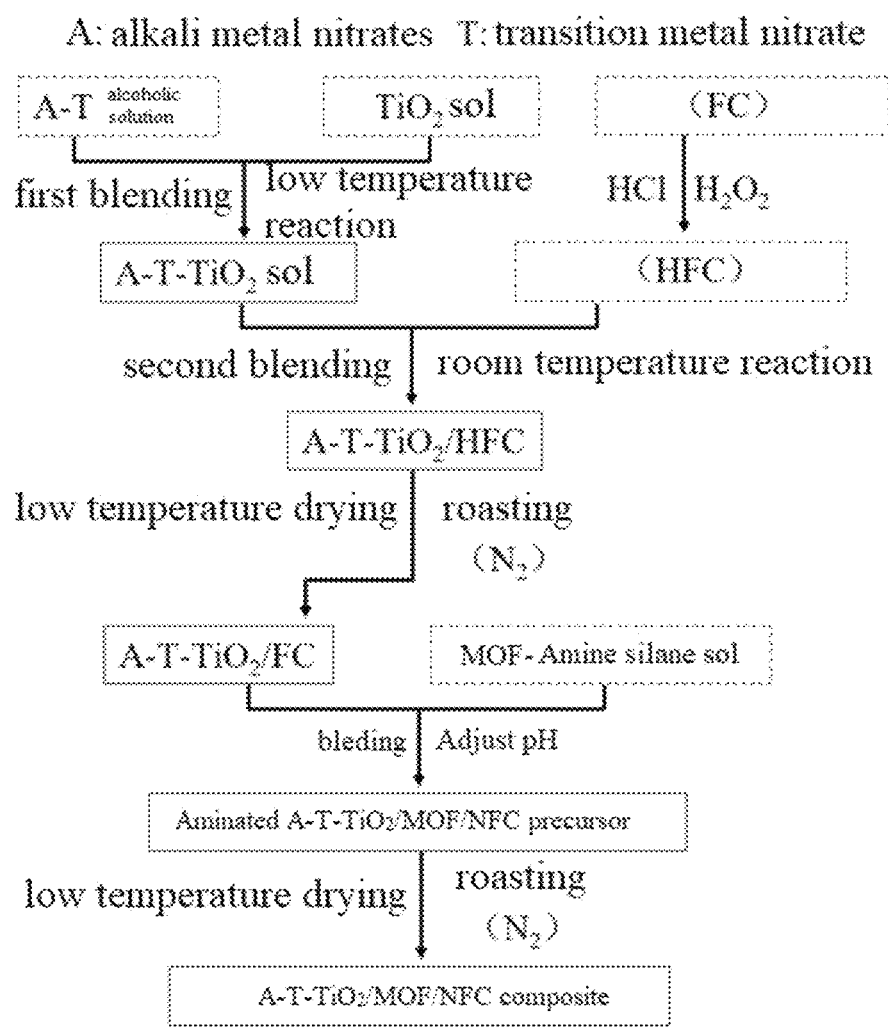

CERAMIC-BASED COMPOSITE MATERIAL USED FOR LOW-CONCENTRATION FORMALDEHYDE DEGRADATION AND PREPARATION METHOD THEREFOR

CROSS-REFERENCE TO RELATED APPLICATIONS

The present application is a continuation of the international application PCT/CN2023/134194 filed on Nov. 27, 2023, which claims the priority benefit to the Chinese Patent Application No. 202211505110.4 filed on Nov. 29, 2022. The entire contents of the above identified applications are incorporated herein by reference.

TECHNICAL FIELD

The invention relates to the technical field of environmental engineering, and in particular to ceramic-based composite material used for low-concentration formaldehyde degradation, and preparation method therefor.

BACKGROUND

Indoor formaldehyde comes from a wide range of sources, such as cigarette smoke, adhesives, artificial boards, wall coverings, paints, carpets, mosquito killer liquids, etc. Among them, adhesives and cigarette smoke are considered to be two important sources of indoor formaldehyde. Mild formaldehyde poisoning may cause headaches and respiratory edema. In severe cases, it may induce bronchial asthma and genetic mutations. my country's "Indoor Air Quality Standards" stipulates that the limit of formaldehyde in the indoor air of ordinary civil buildings is 0.10 mg/m$^3$. Humanity is increasingly paying attention to indoor formaldehyde pollution, and effective formaldehyde control is an urgent need to improve indoor air quality.

Adsorption method is currently a commonly used formaldehyde removal technology and is a physical method. This method mainly uses the functional atoms or groups of the adsorbent itself to adsorb and remove low-concentration formaldehyde. Commonly used adsorbents include activated carbon, MOF, zeolite, graphite, etc. This type of method is simple to operate, but requires constant replacement of adsorbents and cannot fundamentally eliminate formaldehyde pollution. The development of chemical degradation methods has the advantages of completely degrading formaldehyde and making the degradation products pollution-free. A typical method is to use catalytic oxidation to degrade formaldehyde into $CO_2$ and $H_2O$. At present, $TiO_2$ based photocatalyst, Pt/$TiO_2$ catalyst and Pd/$CeO_2$ has been reported as a catalyst that can effectively eliminate formaldehyde at room temperature. For noble metals, their high prices greatly limit their wide application, and there is still a great need to develop low-cost catalysts with good activity at room temperature. For $TiO_2$, due to its large band gap of 3.2 eV, it can only be excited by ultraviolet light to generate electron-hole pairs. Studies have shown that metal doping is considered an effective method to extend its excitation wavelength to visible light. For Embodiments, in $TiO_2$ Medium doping of metal elements such as Cu, V, Cr, Mo, Fe, Co and W is beneficial to shrinking $TiO_2$ band gap and increase its electron-hole generation capacity, thereby improving the photocatalytic activity of the photocatalyst. However, due to the low concentration of formaldehyde in the room or air, this method still has the problem of high cost. Many studies mechanically combine adsorbent materials with catalytic materials to form composite materials to improve the material's ability to remove low-concentration formaldehyde. However, this mechanical combination material also has problems such as large particle pressure drop and difficulty in mass and heat transfer. Considering that porous ceramics have macroporous rigid structures, acid resistance, and corrosion resistance, if adsorbent materials and active materials are loaded into this type of ceramics, on the one hand, the problems of pressure drop, heat and mass transfer caused by powder accumulation can be solved, and on the other hand, it can also increase the dispersion area and catalytic activity of the catalyst, and improve the concentration and degradation of formaldehyde by ceramic matrix composite materials.

SUMMARY

Based on the weaknesses of the above technology, the present invention provides a ceramic-based composite material used for low-concentration formaldehyde degradation, and preparation method therefor. The composite material in the present invention can efficiently enrich low-concentration formaldehyde in the room. The loading of the high specific surface area MOF on the aminated macroporous ceramics and the doping of alkali metals in the active components significantly improve the concentration and degradation effect of the composite material on formaldehyde.

The invention provides a ceramic-based composite material used for low-concentration formaldehyde degradation, and preparation method therefor, which is characterized by having the following processes and steps:

A ceramic-based composite material used for low-concentration formaldehyde degradation characterized by using alkali metal-transition metal-$TiO_2$ (i.e. A-T-$TiO_2$) as the active component, using metal organic framework/aminated ceramic foam (i.e. MOF/NFC) as the carrier, and its short formula is A-T-$TiO_2$/MOF/NFC, where A represents one of Na, K, and Li, T represents one of Cu, Mn, and Co, and MOF represents one of ZIF-8, MOF-199, and UIO-66-$NH_2$, NFC stands for aminated foam ceramic, and the foam ceramic represents one of $Al_2O_3$ ceramic or $ZrO_2$ ceramic. In terms of weight percentage, the active component content in the composite material is 3-10%, the carrier content is 90-97%, and the sum of the two is 100%. Among them, the weight percentage of the three substances in the active component A:T:$TiO_2$ is (5-10):(10-20): (70-85), and the weight percentage of the two substances in the carrier, MOF:NFC, is (4-6):(94-96).

The A-T-$TiO_2$ preparation of/MOF/NFC composites including the preparation of A-T-$TiO_2$/FC and A-T-$TiO_2$/MOF/NFC:

(1) the specific steps for the preparation of A-T-$TiO_2$/FC are as follows:

1). Ultrasonically mix alkali metal nitrate and transition metal nitrate solutions in proportion to obtain a mixed metal salt solution, then add absolute ethanol to obtain an A-T mixed metal alcohol solution; then mixed $TiO_2$ sol with the A-T mixed metal alcohol solution with string to obtain A-T-$TiO_2$ sol;

In step S1, the volume ratio of alkali metal nitrate solution and transition metal nitrate solution is 1:(0.9-1.1); the concentration of alkali metal nitrate and transition metal nitrate solutions to 0.06-0.08 mol/L; the volume ratio of mixed metals salt solution, $TiO_2$ sol and absolute ethanol is (8-10):(4-6): 1; the stirring time is 20-30 min; the stirring temperature is 0-2° C.;

Preparation method of $TiO_2$ sol:tetrabutyl titanate, anhydrous ethanol and water are mixed in a volume ratio of (1-1.2):(6-7):(0.8-1) for reaction, and acetic acid is added dropwise under stirring conditions until $TiO_2$ sol is formed; the reaction temperature is controlled to be 0-2° C., the stirring rate is 300-350 r/min, and the stirring time is 30-40 min; the volume percentage of acetic acid added in the mixed solution is controlled to be 3%-4%.

The concentration of $TiO_2$ sol was controlled to be 50-55 g $L^{-1}$, and the pH value of the sol was 3-4.

2). Immerse HFC with a size of (1-1.5 cm)*(1.5-2 cm)*(1.5-2 cm) into the A-T-$TiO_2$ sol obtained in step S1, and stir at 25-30° C. for 1-2 hours to obtain A-T-$TiO_2$/HFC;

The activation method of the HFC is as follows: immersing the foam ceramic in a mixed solution of 20 wt % HCl solution and 30 wt % $H_2O_2$ solution and maintaining for 10-15 h; then washing with deionized water until neutral, and drying the ceramic obtained after filtration at 100-120° C. for 20-24 h to obtain HFC; the volume ratio of the HCl solution to the $H_2O_2$ solution is (3-5): 1; the volume ratio of HFC to A-T-$TiO_2$ sol is 1:(4-6); the foam ceramic is one of $Al_2O_3$ foam ceramic or $ZrO_2$ foam ceramic; the linear pore number of the foam ceramic is 15-20 ppi;

3). Take out A-T-$TiO_2$/HFC from A-T-$TiO_2$ sol and dry for 0.5-1 h, then dry the air-dried A-T-$TiO_2$/HFC in an oven at 100-120° C. for 4-5 h;

4). The dried A-T-$TiO_2$/HFC is placed in a 350-400° C. tubular furnace under $N_2$ atmosphere and calcined for 5-7 hours to obtain the dehydrated and condensed A-T-$TiO_2$/FC.

(2) Based on step (1), the specific steps for preparing A-T-$TiO_2$/MOF/NFC are as follows:

5). Immerse the A-T-$TiO_2$/FC obtained in step (1) in MOF-aminosilane sol, and add 20 wt % dilute hydrochloric acid dropwise until the pH of the mixture is 2-3, and then stir for 1-2 h to obtain the aminated A-T-$TiO_2$/MOF/NFC precursor.

MOF and aminosilane sol are mixed in a weight ratio of (5-10):(10-15) and stirred for 30-40 minutes; the preparation method of the aminosilane sol is as follows: a mixture of aminosilane, anhydrous ethanol, $H_2O$, and 20 wt % hydrochloric acid is mixed in a volume ratio of (1-2):(35-40):(50-60):(0.2-0.5), and stirred at 25-30° C. for 3-4 hours.

The aminosilanes include 3-aminopropyltriethoxysilane (APTES), 3-aminopropyltrimethoxysilane (APTMS), tributylaminomethylsilane (TBAMS)

6). The A-T-$TiO_2$/MOF/NFC precursor obtained in step 1) was taken out from the MOF-aminosilane sol, and air-dried for 1-2 hours, and then dried in an oven at 60-80° C. for 20-40 minutes;

7). The A-T-$TiO_2$/MOF/NFC precursor obtained after drying in step 6) is placed in a tube furnace at 180-200° C. under $N_2$ atmosphere and maintained for 2-3 hours to obtain A-T-$TiO_2$/MOF/NFC.

The MOF described in step P1 includes one of ZIF-8, MOF-199, and UIO-66-NH2, wherein the preparation of ZIF-8 is synthesized according to the reference method (DOI: 10.1016/j.cattod.2019.06.076); the preparation of MOF-199 is synthesized according to the reference method (DOI: 10.1016/j.ceramint.2020.12.149); the preparation of UIO-66-NH2 is synthesized according to the reference method (DOI: 10.1016/j.cej.2020.125328), and the specific steps are as follows:

Preparation steps of ZIF-8: 2.9 g $Zn(NO_3)·6H_2O$ and 6.9 g 2-methylimidazole (2-mIM) were dissolved in 100 mL methanol.

Then, the zinc salt solution and the 2-mim solution were vigorously stirred at 30° C. for 2 h.

After the synthesis reaction was completed, the white precipitate was centrifuged and filtered, washed three times with methanol, and dried at 70° C. for 24 h to obtain the ZIF-8 product.

Preparation steps of MOF-199: Dissolve $Cu(NO_3)_2.3H_2O$ (0.27 g) in 36 mL of water, pour into 36 mL of ethanol containing 0.12 g of 1,3,5-benzenetricarboxylic acid and stir for 30 min, then transfer the resulting solution to a Teflon stainless steel autoclave, heat at 120° C. for 12 h, cool to 25-30° C., and then filter and thoroughly wash the resulting solid three times with water and ethanol alternately. Finally, the blue solid was dried at 80° C. overnight.

Preparation steps of UIO-66-$NH_2$: First, add 535.9 mg $ZrCl_4$ and 416.6 mg $NH_2$-$H_2BDC$ into a mixture containing 30 mL DMF and 2.0 mL water. After stirring for 30 min, the slurry was poured into a 100 mL Teflon autoclave and heated at 120° C. for 24 h. The UIO-66-$NH_2$ nanocrystals were separated by centrifugation and washed three times with 40.0 mL DMF to remove unreacted ligands.

Compared with the prior art, the present invention has the following advantages:

(1) Select MOF materials with high specific surface area or small pore size as composite adsorbents to enhance the adsorption capacity of composite materials for formaldehyde.

(2) The amine groups in aminated ceramics can form amine-aldehyde conjugation, resulting in increased formaldehyde adsorption capacity. Therefore, foam ceramics modified by amine groups are beneficial to improving the formaldehyde adsorption capacity of ceramics.

(3) Single powder MOF materials have high specific surface area characteristics, but when used as formaldehyde capture materials, they have disadvantages such as large pressure drop and poor mass transfer capacity. Foam ceramics are suitable as carriers for powdered MOF materials due to their rigid structure and large pores. The ceramic framework loaded with MOF largely alleviates or eliminates the pressure drop and heat and mass transfer problems between MOF particles.

(4) The macroporous foam ceramic not only serves as the supporting material of MOF, but also increases the distribution area of the catalyst and reduces the probability of catalyst agglomeration, thereby improving the adsorption of formaldehyde and the photocatalytic activity of the composite material.

(5) Compared with precious metals, alkali metals such as Na, K, and Li doped in active components help reduce costs.

In addition, these doped alkali metals can not only improve the stability and dispersibility of the active components, but also promote the chemical adsorption/dissociation of oxygen and the formation of surface OH groups, which is beneficial to improving the photocatalytic activity of the material.

BRIEF DESCRIPTION OF DRAWINGS

FIG. 1 is a flow chart for preparing the A-T-$TiO_2$/MOF/NFC composite material of the present invention.

PREFERRED EMBODIMENTS

The specific embodiments of the present invention are described below, but the embodiments of the present invention are not limited thereto.

Embodiments 1

A ceramic-based composite material for low-concentration formaldehyde degradation and a preparation method thereof, characterized in that A-Cu—$TiO_2$ is used as an active component and ZIF-8/NFC is used as a carrier; its simplified formula is A-Cu—$TiO_2$/ZIF-8/NFC, wherein A represents one of Na, K and Li.

In terms of weight percentage, the content of active components in the composite material is 3%, the carrier is 97%, and the sum of the two is 100%.

Among them, the weight percentage of the three substances in the active component A:Cu:$TiO_2$ is 5:10:85, and the weight percentage of the two substances in the carrier ZIF-8:NFC is 4:96.

A ceramic-based composite material for low-concentration formaldehyde degradation and a preparation method thereof, characterized in that the preparation of the A-Cu—$TiO_2$/ZIF-8/NFC composite material comprises the following steps:

1) 0.06 mol/L $ANO_3$ solution and the same concentration of $Cu(NO_3)_2$ solution were mixed in a volume ratio of 1:1 to obtain a mixed metal salt solution, and then anhydrous ethanol was added to obtain an A-Cu mixed metal alcohol solution; $TiO_2$ sol and the A-Cu mixed metal alcohol solution were mixed and stirred to obtain A-Cu—$TiO_2$ sol;

The volume ratio of the mixed metal salt solution, $TiO_2$ sol and anhydrous ethanol was controlled to be 8:4:1; the stirring time was 20 minutes; the stirring temperature was 0° C.; the concentration of $TiO_2$ sol was controlled to be 50 $gL^{-1}$, and the pH value was 3.

2) Immerse HFC with a size of 1 cm*1.5 cm*1.5 cm into the A-Cu—$TiO_2$ sol obtained in step 1), and stir at 25° C. for 1 hour to obtain A-Cu—$TiO_2$/HFC;

The activation method of the HFC is as follows: immersing the foam ceramic in a mixed solution of 20 wt % HCl solution and 30 wt % $H_2O_2$ solution and keeping it for 10 hours; then washing with deionized water until neutral, and then drying the ceramic obtained after filtration at 100° C. for 20 hours to obtain HFC; the volume ratio of the HCl solution to the $H_2O_2$ solution is 3:1; the volume ratio of HFC to A-Cu—$TiO_2$ sol is 1:4; the foam ceramic is $Al_2O_3$ foam ceramic, and the linear pore number of the foam ceramic is 15 ppi;

3) Take A-Cu—$TiO_2$/HFC out of A-Cu—$TiO_2$ sol and air-dry for 0.5 h, then dry the air-dried A-Cu—$TiO_2$/HFC in an oven at 100° C. for 4 h;

4) The dried A-Cu—$TiO_2$/HFC was placed in a 350° C. tubular furnace under $N_2$ atmosphere and calcined for 5 hours to obtain the dehydrated and condensed A-Cu—$TiO_2$/FC.

5) Immerse the A-Cu—$TiO_2$/FC obtained in step 4) into the ZIF-8/APTES sol, and add 20 wt % dilute hydrochloric acid dropwise until the pH of the mixture is 2, and then stir for 1 hour to obtain the aminated A-Cu—$TiO_2$/ZIF-8/NFC precursor.

The preparation method of the ZIF-8/APTES sol is as follows: ZIF-8 and APTES sol are mixed in a weight ratio of 5:10 and stirred for 30 minutes; the preparation method of the APTES sol is as follows: APTES, anhydrous ethanol, $H_2O$, and 20 wt % hydrochloric acid are mixed in a volume ratio of 1:35:50:0.2 and stirred at 25° C. for 3 hours;

6) The A-Cu—$TiO_2$/ZIF-8/NFC precursor obtained in step 5) was taken out from the ZIF-8/APTES sol, air-dried for 1 hour, and then dried in an oven at 60° C. for 20 minutes;

7) The A-Cu—$TiO_2$/ZIF-8-NFC precursor obtained after drying in step 6) is placed in a tube furnace at 180° C. under $N_2$ atmosphere and maintained for 2 hours to obtain A-Cu—$TiO_2$/ZIF-8/NFC.

Evaluation conditions: A-Cu—$TiO_2$/ZIF-8/NFC was soaked in fresh methanol for three consecutive times, and the solid composite material was filtered out after each soaking for 24 hours, and then the composite material was vacuum dried at 60° C. for 6 hours.

The reaction was carried out in a continuous flow fixed bed at 30° C., normal pressure, reaction space velocity 10000 $h^{-1}$, formaldehyde pollutant concentration 100 ppm, and finally detected by gas chromatography.

The evaluation results are shown in Table 1.

TABLE 1

Formaldehyde removal performance of alkali metal-doped composite materials in Embodiments 1

| Schema | Doped alkali metal | Composite | Formaldehyde | Formaldehyde removal rate (%) |
|---|---|---|---|---|
| I | Li | Li—Cu—$TiO_2$/ZIF-8/NFC | 100 ppm | 79 |
| II | Na | Na—Cu—$TiO_2$/ZIF-8/NFC | | 82 |
| III | K | K—Cu—$TiO_2$/ZIF-8/NFC | | 85 |

Comparative Embodiments 1

The composite material was prepared by referring to Embodiments 1, except that ZIF-8 was replaced by MOF-199 and UIO-66-$NH_2$, and the other conditions were the same to prepare the A-Cu—$TiO_2$/ZIF-8/MOF-199 composite material.

The evaluation conditions are the same as those in Embodiments 1, and the evaluation results are shown in Table 2.

TABLE 2

Formaldehyde removal performance of alkali metal-doped composite materials in Comparative Embodiments 1

| Schema | Doped alkali metal | Composite | Formaldehyde | Formaldehyde removal rate (%) |
|---|---|---|---|---|
| I | Li | Li—Cu—$TiO_2$/MOF-199/NFC | 100 ppm | 87 |
| II | Na | Na—Cu—$TiO_2$/MOF-199/NFC | | 91 |
| III | K | K—Cu—$TiO_2$/MOF-199/NFC | | 94 |
| IV | Li | Li—Cu—$TiO_2$/UIO-66-$NH_2$/NFC | | 64 |
| V | Na | Na—Cu—$TiO_2$/UIO-66-$NH_2$/NFC | | 77 |
| VI | K | K—Cu—$TiO_2$/UIO-66-$NH_2$/NFC | | 81 |

Comparative Embodiments 2

A ceramic-based composite material for low-concentration formaldehyde degradation and a preparation method thereof, characterized in that A-Cu—TiO$_2$ is used as an active component and FC is used as a carrier; its simplified formula is A-Cu—TiO$_2$/FC, wherein A represents one of Na, K, and Li.

In terms of weight percentage, the content of active components in the composite material is 5%, the carrier is 95%, and the sum of the two is 100%.

Among them, the weight percentage of the three substances in the active component A:Cu:TiO$_2$ is 5:10:85.

A ceramic-based composite material for low-concentration formaldehyde degradation and a preparation method thereof, characterized in that the preparation of the A-Cu—TiO$_2$/FC composite material comprises the following steps:

1) 0.06 mol/L ANO$_3$ solution and 0.08 mol/L Cu(NO$_3$)$_2$ solution were mixed in a volume ratio of 1:0.9 to obtain a mixed metal salt solution, and then anhydrous ethanol was added to obtain an A-Cu mixed metal alcohol solution; TiO$_2$ sol and the A-Cu mixed metal alcohol solution were mixed and stirred to obtain an A-Cu—TiO$_2$ sol;

The volume ratio of the mixed metal salt solution, TiO$_2$ sol and anhydrous ethanol was controlled to be 9:5:1; the stirring time was 30 minutes; the stirring temperature was 0° C.; the concentration of TiO$_2$ sol was controlled to be 55 gL$^{-1}$, and the pH value was 3.

2) Immerse HFC with a size of 1 cm*1.5 cm*1.5 cm into the A-Cu—TiO$_2$ sol obtained in step 1), and stir at 30° C. for 1 hour to obtain A-Cu—TiO$_2$/HFC;

The activation method of the HFC is as follows: immersing the foam ceramic in a mixed solution of 20 wt % HCl solution and 30 wt % H$_2$O$_2$ solution and keeping it for 12 hours; then washing with deionized water until neutral, and drying the ceramic obtained after filtration at 100° C. for 20 hours to obtain HFC; the volume ratio of the HCl solution to the H$_2$O$_2$ solution is 4:1; the volume ratio of HFC to A-Cu—TiO$_2$ sol is 1:5; the foam ceramic is Al$_2$O$_3$ foam ceramic, and the linear pore number of the foam ceramic is 20 ppi;

3) taking out A-Cu—TiO$_2$/HFC from A-Cu—TiO$_2$ sol and letting it stand to air-dry for 0.5 h, and then drying the air-dried A-Cu—TiO$_2$/HFC in an oven at 120° C. for 4 h;

4) The dried A-Cu—TiO$_2$/HFC was placed in a 350° C. tubular furnace under N$_2$ atmosphere and calcined for 6 hours to obtain the dehydrated and condensed A-Cu—TiO$_2$/FC.

Evaluation conditions: A-Cu—TiO$_2$/FC was reacted in a continuous flow fixed bed at 30° C., normal pressure, reaction space velocity 10000 h$^{-1}$, formaldehyde pollutant concentration 100 ppm, and finally detected by gas chromatography.

The evaluation results are shown in Table 3.

TABLE 3

Formaldehyde removal performance of alkali metal-doped composite materials in comparative Embodiments 2

| Schema | Doped alkali metal | Composite | Formaldehyde | Formaldehyde removal rate (%) |
|---|---|---|---|---|
| I | Li | Li—Cu—TiO$_2$/FC | 100 ppm | 33 |
| II | Na | Na—Cu—TiO$_2$/FC | | 37 |
| III | K | K—Cu—TiO$_2$/FC | | 42 |

Comparative Embodiments 3

A ceramic-based composite material for low-concentration formaldehyde degradation and a preparation method thereof, characterized in that T-TiO$_2$ is used as an active component and ZIF-8/NFC is used as a carrier; its simplified formula is T-TiO$_2$/ZIF-8/NFC, wherein T represents one of Cu, Mn and Co.

In terms of weight percentage, the content of active components in the composite material is 8%, the content of the carrier is 92%, and the sum of the two is 100%. Among them, the weight percentage of the two substances in the active component T:TiO$_2$ is 10:90, and the weight percentage of the two substances in the carrier ZIF-8:NFC is 5:95.

A ceramic-based composite material for low-concentration formaldehyde degradation and a preparation method thereof, characterized in that the preparation of the T-TiO$_2$/ZIF-8/NFC composite material comprises the following steps:

1) adding anhydrous ethanol to a 0.06 mol/L T (NO$_3$)$_2$ solution to obtain a T alcohol solution; then mixing and stirring the TiO$_2$ sol and the T mixed metal alcohol solution to obtain a T-TiO$_2$ sol;

The volume ratio of the mixed metal salt solution, TiO$_2$ sol and anhydrous ethanol was controlled to be 8:4:1; the stirring time was 20 minutes; the stirring temperature was 0° C.; the concentration of TiO$_2$ sol was controlled to be 50 gL$^{-1}$, and the pH value was 3.

2) Immerse HFC with a size of 1.5 cm*2 cm*2 cm in the T-TiO$_2$ sol obtained in step 1), stir at 25° C. for 1 h to obtain T-TiO$_2$/HFC;

The activation method of the HFC is as follows: immersing the foam ceramic in a mixed solution of 20 wt % HCl solution and 30 wt % H$_2$O$_2$ solution and maintaining for 10 hours; then washing with deionized water until neutral, and drying the ceramic obtained after filtration at 100° C. for 20 hours to obtain HFC; the volume ratio of the HCl solution to the H$_2$O$_2$ solution is 4:1; the volume ratio of HFC to T-TiO$_2$ sol is 1:5; the foam ceramic is ZrO2 foam ceramic, and the linear pore number of the foam ceramic is 20 ppi;

3) Take T-TiO$_2$/HFC out of A-Cu—TiO$_2$ sol and 1 air-dry for 0.5 h, then dry the air-dried T-TiO$_2$/HFC in an oven at 100° C. for 4 h;

4) The dried T-TiO$_2$/HFC is placed in a 380° C. tubular furnace under N$_2$ atmosphere and calcined for 6 hours to obtain the dehydrated and condensed T-TiO$_2$/FC.

5) Immerse the T-TiO$_2$/FC obtained in step 4) in the ZIF-8/APTES sol, and add 20 wt % dilute hydrochloric acid dropwise until the pH of the mixture is 2, and then stir for 1 hour to obtain the aminated T-TiO$_2$/ZIF-8/NFC precursor.

The preparation method of the ZIF-8/APTES sol is as follows: ZIF-8 and APTES sol are mixed in a weight ratio of 8:10 and stirred for 40 minutes; the preparation method of the APTES sol is as follows: APTES, anhydrous ethanol, H$_2$O, and 20 wt % hydrochloric acid are mixed in a volume ratio of 1:35:50:0.2 and stirred at 25° C. for 3 hours;

6) The T-TiO$_2$/ZIF-8/NFC precursor obtained in step 5) was taken out from the ZIF-8/APTES sol, and air-dried for 1 hour, and then dried in an oven at 80° C. for 30 minutes;

7) The T-TiO$_2$/ZIF-8/NFC precursor obtained after drying in step 6) was placed in a tube furnace at 180° C. under N$_2$ atmosphere and maintained for 3 hours to obtain T-TiO$_2$/ZIF-8/NFC.

Evaluation conditions: T-TiO$_2$/ZIF-8/NFC was soaked in fresh methanol for three consecutive times, and the solid composite material was filtered out after each soaking for 24 hours, and then the composite material was vacuum dried at 60° C. for 6 hours.

The reaction was carried out in a continuous flow fixed bed at 30° C., normal pressure, reaction space velocity 10000 h$^{-1}$, formaldehyde pollutant concentration 100 ppm, and finally detected by gas chromatography.

The evaluation results are shown in Table 4.

TABLE 4

Formaldehyde removal performance of the alkali metal-doped composite material in Comparative Embodiments 3

| Schema | Doped alkali metal | Composite | Formaldehyde | Formaldehyde removal rate (%) |
|---|---|---|---|---|
| I | Mn | Mn—TiO$_2$/ZIF-8/NFC | 100 ppm | 71 |
| II | Co | Co—TiO$_2$/ZIF-8/NFC | | 78 |
| III | Cu | Cu—TiO$_2$/ZIF-8/NFC | | 81 |

Embodiments 2

A ceramic-based composite material for low-concentration formaldehyde degradation and a preparation method thereof, characterized in that K-T-TiO$_2$ is used as an active component and MOF-199/NFC is used as a carrier; its simplified formula is K-T-TiO$_2$/MOF-199/NFC, wherein T represents one of Cu, Mn, and Co.

In terms of weight percentage, the content of active components in the composite material is 8%, the content of the carrier is 92%, and the sum of the two is 100%.

Among them, the weight percentage of the three substances K:T:TiO$_2$ in the active component is 5:10:85, and the weight percentage of the two substances MOF-199:NFC in the carrier is 5:95.

A ceramic-based composite material for low-concentration formaldehyde degradation and a preparation method thereof, characterized in that the preparation of the K-T-TiO$_2$/MOF-199/NFC composite material comprises the following steps:
1) 0.06 mol/L KNO$_3$ solution and 0.06 mol/L T(NO$_3$)$_2$ solution were mixed in a volume ratio of 1:1 to obtain a mixed metal salt solution, and then anhydrous ethanol was added to obtain a K-T mixed metal alcohol solution; TiO$_2$ sol and the K-T mixed metal alcohol solution were mixed and stirred to obtain a K-T-TiO$_2$ sol;
   The volume ratio of the mixed metal salt solution, TiO$_2$ sol and anhydrous ethanol was controlled to be 8:4:1; the stirring time was 20 minutes; the stirring temperature was 0° C.; the concentration of TiO$_2$ sol was controlled to be 50 gL$^{-1}$, and the pH value was 3.
2) Immerse HFC with a size of 1.5 cm*2 cm*2 cm into the K-T-TiO$_2$ sol obtained in step 1), stir at 25° C. for 1 hour to obtain K-T-TiO$_2$/HFC;
   The activation method of the HFC is as follows: immersing the foam ceramic in a mixed solution of 20 wt % HCl solution and 30 wt % H$_2$O$_2$ solution and maintaining for 10 hours; then washing with deionized water until neutral, and drying the ceramic obtained after filtration at 120° C. for 24 hours to obtain HFC; the volume ratio of the HCl solution to the H$_2$O$_2$ solution is 5:1; the volume ratio of HFC to K-T-TiO$_2$ sol is 1:6; the foam ceramic is Al$_2$O$_3$ foam ceramic, and the linear pore number of the foam ceramic is 20 ppi;
3) Take out K-T-TiO$_2$/HFC from K-T-TiO$_2$ sol and air-dry for 0.5 h, then dry the air-dried K-T-TiO$_2$/HFC in an oven at 100° C. for 4 h;
4) The dried K-T-TiO$_2$/HFC is placed in a 380° C. tubular furnace under N$_2$ atmosphere and calcined for 5 hours to obtain the dehydrated and condensed K-T-TiO$_2$/FC.
5) Immerse the K-T-TiO$_2$/FC obtained in step 4) in MOF-199/APTES sol, and add 20 wt % dilute hydrochloric acid dropwise until the pH of the mixture is 2, and then stir for 1 hour to obtain an aminated K-T-TiO$_2$/MOF-199/NFC precursor.

The preparation method of the MOF-199/APTES sol is as follows: MOF-199 and APTES sol are mixed in a weight ratio of 5:15 and stirred for 30 minutes; the preparation method of the APTES sol is as follows: A mixture of APTES, anhydrous ethanol, H$_2$O, and 20 wt % hydrochloric acid is mixed in a volume ratio of 1:40:50:0.4 and stirred at 25° C. for 3 hours;
6) The K-T-TiO$_2$/MOF-199/NFC precursor obtained in step 5) was taken out from the MOF-199/APTES sol, and air-dried for 1 hour, and then dried in an oven at 60° C. for 20 minutes;
7) The K-T-TiO$_2$/MOF-199/NFC precursor obtained after drying in step 6) is placed in a tube furnace at 180° C. under N$_2$ atmosphere and maintained for 2 hours to obtain K-T-TiO$_2$/MOF-199/NFC.

Evaluation conditions: K-T-TiO$_2$/MOF-199/NFC was soaked in fresh methanol for three consecutive times, and the solid composite material was filtered out after each soaking for 24 hours, and then the composite material was vacuum dried at 60° C. for 6 hours.

The reaction was carried out in a continuous flow fixed bed at 30° C., normal pressure, reaction space velocity 10000 h$^{-1}$, formaldehyde pollutant concentration 100 ppm, and finally detected by gas chromatography.

The evaluation results are shown in Table 5.

TABLE 5

Formaldehyde removal performance of alkali metal-doped composite materials in Embodiments 2

| Schema | Doped alkali metal | Composite | Formaldehyde | Formaldehyde removal rate (%) |
|---|---|---|---|---|
| I | Mn | K—Mn—TiO$_2$/MOF-199/NFC | 100 ppm | 77 |
| II | Co | K—Co—TiO$_2$/MOF-199/NFC | | 84 |
| III | Cu | K—Cu—TiO$_2$/MOF-199/NFC | | 86 |

Embodiments 3

A ceramic-based composite material for low-concentration formaldehyde degradation and a preparation method thereof, characterized in that K-Cu—TiO$_2$ is used as an active component and MOF-199/NFC is used as a carrier, and its simplified formula is K-Cu—TiO$_2$/MOF-199/NFC.

In terms of weight percentage, the content of active components in the composite material is 10%, the carrier is 90%, and the sum of the two is 100%.

Among them, the weight percentage of the three substances in the active component K:Cu:TiO$_2$ is 5:10:85, and the weight percentage of the two substances in the carrier ZIF-8:NFC is 6:94.

A ceramic-based composite material for low-concentration formaldehyde degradation and a preparation method thereof, characterized in that the preparation of the K-Cu—TiO$_2$/ZIF-8/NFC composite material comprises the following steps:
1) 0.06 mol/L KNO$_3$ solution and 0.06 mol/L Cu(NO$_3$)$_2$ solution were mixed in a volume ratio of 1:1 to obtain a mixed metal salt solution, and then anhydrous ethanol was added to obtain a K-Cu mixed metal alcohol solution; TiO$_2$ sol and the K-Cu mixed metal alcohol solution were mixed and stirred to obtain a K-Cu—TiO$_2$ sol;

The volume ratio of the mixed metal salt solution, TiO$_2$ sol and anhydrous ethanol was controlled to be 10:6:1; the stirring time was 30 minutes; the stirring temperature was 2° C.; the concentration of TiO$_2$ sol was controlled to be 55 gL$^{-1}$, and the pH value was 4.

2) Immerse HFC with a size of 1 cm*1.5 cm*1.5 cm into the A-Cu—TiO$_2$ sol obtained in step 1), stir at 25° C. for 1 hour to obtain K-Cu—TiO$_2$/HFC;

The activation method of the HFC is as follows: immersing the foam ceramic in a mixed solution of 20 wt % HCl solution and 30 wt % H$_2$O$_2$ solution and keeping it for 10 hours; then washing with deionized water until neutral, and drying the ceramic obtained after filtration at 100° C. for 20 hours to obtain HFC; the volume ratio of the HCl solution to the H$_2$O$_2$ solution is 5:1; the volume ratio of HFC to K-Cu—TiO$_2$ sol is 1:4; the foam ceramic is ZrO$_2$ foam ceramic, and the linear pore number of the foam ceramic is 20 ppi;

3) Take out K-Cu—TiO$_2$/HFC from K-Cu—TiO$_2$ sol and air-dry for 0.5 h, then dry the air-dried K-Cu—TiO$_2$/HFC in an oven at 100° C. for 4 h;

4) The dried K-Cu—TiO$_2$/HFC was placed in a 400° C. tubular furnace under N$_2$ atmosphere and calcined for 6 hours to obtain A-Cu—TiO$_2$/FC after dehydration condensation.

5) Immerse the K-Cu—TiO$_2$/FC obtained in step 4) in MOF-199/aminosilane sol, and add 20 wt % dilute hydrochloric acid dropwise until the pH of the mixture is 2, and then stir for 1 hour to obtain an aminated K-Cu—TiO$_2$/MOF-199/NFC precursor.

The preparation method of the MOF-199/aminosilane sol is: MOF-199 and aminosilane sol are mixed in a weight ratio of 10:15 and stirred for 30 minutes; the preparation method of the aminosilane sol is: a mixture of aminosilane, anhydrous ethanol, H$_2$O, and 20 wt % hydrochloric acid is mixed in a volume ratio of 2:40:60:0.5, and stirred at 30° C. for 3 hours; the aminosilane includes APTES, APTMS, and TBAMS.

6) The K-Cu—TiO$_2$/MOF-199/NFC precursor obtained in step 5) was taken out from the MOF-199/aminosilane sol, and air-dried for 1 hour, and then dried in an oven at 60° C. for 20 minutes;

7) The K-Cu—TiO$_2$/MOF-199/NFC precursor obtained after drying in step 6) is placed in a tube furnace at 200° C. under N$_2$ atmosphere and maintained for 3 hours to obtain K-Cu—TiO$_2$/MOF-199/NFC.

Evaluation conditions: K-Cu—TiO$_2$/MOF-199/NFC was soaked in fresh methanol for three consecutive times, and the solid composite material was filtered out after each soaking for 24 hours, and then the composite material was vacuum dried at 60° C. for 6 hours.

The reaction was carried out in a continuous flow fixed bed at 30° C., normal pressure, reaction space velocity 10000 h$^{-1}$, formaldehyde pollutant concentration 100 ppm, and finally detected by gas chromatography.

The evaluation results are shown in Table 6.

TABLE 6

Formaldehyde removal performance of alkali metal-doped composite materials in Embodiments 3

| Schema | Doped alkali metal | Composite | Formaldehyde | Formaldehyde removal rate (%) |
|---|---|---|---|---|
| I | APTES | K—Cu—TiO$_2$/MOF-199/NFC-1 | 100 ppm | 96 |
| II | APTMS | K—Cu—TiO$_2$/MOF-199/NFC-2 | | 93 |
| III | TBAMS | K—Cu—TiO$_2$/MOF-199/NFC-3 | | 82 |

In summary, the present invention aims to solve the problems of difficulty in enriching low-concentration formaldehyde in the air or indoors and poor photocatalytic effect of transition metal-TiO$_2$ catalyst on formaldehyde. By introducing an aminated foam ceramic carrier loaded with MOF and doping alkali metals in the active component, the adsorption and degradation performance of the composite material on formaldehyde is significantly improved.

The embodiments show that the loading of MOF-199 and the modification of ceramics by APTES are beneficial to the removal of formaldehyde.

In addition, the comparison results between the embodiments and the comparative embodiments show that alkali metal doping has a good promoting effect on the formaldehyde degradation performance of the A-T-TiO$_2$/MOF-199/NFC composite material at room temperature, and the order is K>Na>Li.

We claim:

1. A ceramic-based composite material used for low-concentration formaldehyde degradation characterized in that:
using alkali metal-transition metal-TiO$_2$ as an active component, the alkali metal-transition metal-TiO$_2$ comprising A-T-TiO$_2$, using metal organic framework/aminated ceramic foam as a carrier, the metal organic framework/aminated ceramic foam comprising MOF/NFC, and a formula of the ceramic-based composite material is A-T-TiO$_2$/MOF/NFC, where A represents one of Na, K, and Li, T represents one of Cu, Mn, and Co, and MOF represents one of ZIF-8, MOF-199, and UIO-66-NH$_2$, NFC represents an aminated foam ceramic comprising Al$_2$O$_3$ ceramic or ZrO$_2$ ceramic; in terms of weight percentage, the active component in the ceramic-based composite material is 3-10%, the carrier is 90-97%, and a sum of the two is 100%; a weight percentage in the active component A:T:TiO$_2$ is (5-10):(10-20):(70-85), and a weight percentage in the carrier, MOF:NFC is (4-6):(94-96).

2. A method for preparing the ceramic-based composite material used for low-concentration formaldehyde degradation of claim 1, comprising preparation of A-T-TiO$_2$/FC and preparation of A-T-TiO$_2$/MOF/NFC:
the specific steps for the preparation of A-T-TiO$_2$/FC are as follows:
1) ultrasonically mix an alkali metal nitrate solution and a transition metal nitrate solution in proportion to obtain a mixed metal salt solution, then add absolute ethanol to obtain an A-T mixed metal alcohol solution; then mix TiO$_2$ sol with the A-T mixed metal alcohol solution with stirring to obtain A-T-TiO$_2$ sol;

in step 1), a volume ratio of the alkali metal nitrate solution and the transition metal nitrate solution is 1:(0.9-1.1); a concentration of the alkali metal nitrate solution and the transition metal nitrate solution is controlled at 0.06-0.08 mol/L; a volume ratio of the mixed metal salt solution, $TiO_2$ sol and absolute ethanol is (8-10):(4-6):1; a stirring time is 20-30 min; a stirring temperature is 0-2° C.; a concentration of $TiO_2$ sol is 50-55 g $L^{-1}$, pH is 3-4;

2) immerse HFC with a size of (1-1.5 cm)*(1.5-2 cm)*(1.5-2 cm) into the A-T-$TiO_2$ sol obtained in step 1), and stir at 25-30° C. for 1-2 hours to obtain A-T-$TiO_2$/HFC; an activation method of the HFC is as follows: immersing the foam ceramic in a mixed solution of 20 wt % HCl solution and 30 wt % $H_2O_2$ solution and maintaining for 10-15 h; then washing with deionized water until neutral, and drying the ceramic obtained after filtration at 100-120° C. for 20-24 h to obtain HFC; a volume ratio of the HCl solution to the $H_2O_2$ solution is (3-5):1; a volume ratio of HFC to A-T-$TiO_2$ sol is 1:(4-6); the foam ceramic is $Al_2O_3$ foam ceramic or $ZrO_2$ foam ceramic; linear pore number of the foam ceramic is 15-20 ppi;

3) take out A-T-$TiO_2$/HFC from A-T-$TiO_2$ sol and dry for 0.5-1 h, then dry air-dried A-T-TiO2/HFC in an oven at 100-120° C. for 4-5 h;

4) the dried A-T-$TiO_2$/HFC is placed in a 350-400° C. tubular furnace under $N_2$ atmosphere and calcined for 5-7 hours to obtain dehydrated and condensed A-T-$TiO_2$/FC;

the specific steps for preparing A-T-$TiO_2$/MOF/NFC are as follows:

5) immerse the A-T-$TiO_2$/FC obtained in step (1) in MOF-aminosilane sol, and add 20 wt % dilute hydrochloric acid dropwise until the pH of the mixture is 2-3, and then stir for 1-2 h to obtain aminated A-T-$TiO_2$/MOF/NFC precursor;

MOF and aminosilane sol are mixed in a weight ratio of (5-10):(10-15) and stirred for 30-40 minutes; preparation method of the aminosilane sol is as follows: a mixture of aminosilane, anhydrous ethanol, $H_2O$, and 20 wt % hydrochloric acid is mixed in a volume ratio of (1-2):(35-40):(50-60):(0.2-0.5), and stirred at 25-30° C. for 3-4 hours;

6) the A-T-$TiO_2$/MOF/NFC precursor obtained in step 1) was taken out from the MOF-aminosilane sol, and air-dried for 1-2 hours, and then dried in an oven at 60-80° C. for 20-40 minutes;

7) the A-T-$TiO_2$/MOF/NFC precursor obtained after drying in step 6) is placed in a tube furnace at 180-200° C. under $N_2$ atmosphere and maintained for 2-3 hours to obtain A-T-$TiO_2$/MOF/NFC.

3. The method according to claim 2 characterized in that: the aminosilane is one of 3-aminopropyl triethoxysilane, 3-aminopropyl trimethoxysilane, or tributyl aminomethyl silane.

\* \* \* \* \*